US007290002B2

(12) United States Patent
Shapiro et al.

(10) Patent No.: US 7,290,002 B2
(45) Date of Patent: Oct. 30, 2007

(54) SYSTEM-WIDE SELECTIVE ACTION MANAGEMENT

(75) Inventors: Marc Shapiro, Cambridge (GB); James William O'Brien, Cambridge (GB); Caroline Elizabeth Matheson, Cambridge (GB); Pablo R. Rodriguez, Cambridge (GB); Manuel Costa, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 10/786,674

(22) Filed: Feb. 25, 2004

(65) Prior Publication Data

US 2004/0267877 A1 Dec. 30, 2004

Related U.S. Application Data

(63) Continuation-in-part of application No. 10/602,201, filed on Jun. 24, 2003, now abandoned.

(51) Int. Cl.
*G06F 7/00* (2006.01)
*G06F 17/30* (2006.01)

(52) U.S. Cl. .................. 707/101; 707/202; 707/204
(58) Field of Classification Search ............... 707/1
See application file for complete search history.

(56) References Cited

U.S. PATENT DOCUMENTS

| 5,758,154 A * | 5/1998 | Qureshi ...................... 713/1 |
| 6,108,668 A * | 8/2000 | Bates et al. ................. 707/203 |
| 6,185,577 B1 * | 2/2001 | Nainani et al. ............. 707/202 |
| 6,539,402 B1 * | 3/2003 | Sorenson et al. ........... 707/202 |
| RE38,270 E * | 10/2003 | Nakajima .................... 713/1 |
| 6,633,869 B1 * | 10/2003 | Duparcmeur et al. ......... 707/6 |
| 6,704,737 B1 * | 3/2004 | Nixon et al. ................ 707/101 |
| 6,721,767 B2 * | 4/2004 | De Meno et al. ........... 707/204 |
| 6,785,722 B2 * | 8/2004 | Vuong et al. ............... 709/223 |
| 6,839,896 B2 * | 1/2005 | Coffman et al. ............ 719/310 |
| 6,925,476 B1 * | 8/2005 | Multer et al. ............... 707/200 |
| 7,003,695 B2 * | 2/2006 | Li .............................. 714/19 |
| 2002/0013846 A1 * | 1/2002 | Vuong et al. ............... 709/226 |
| 2003/0005174 A1 * | 1/2003 | Coffman et al. ........... 709/318 |
| 2003/0093479 A1 * | 5/2003 | Mellen-Garnett et al. ... 709/205 |

(Continued)

OTHER PUBLICATIONS

"The Case for an Open Data Model" by Brad A. Myers, Carnegie Mellon University, Aug. 1998.*

(Continued)

*Primary Examiner*—Tim Vo
*Assistant Examiner*—Jay Morrison (57) ABSTRACT

A system-wide selective action management facility is provided. Such a facility can support selective action management for multiple applications executing on one or more computer systems (including the operating system and its components, such as a file system). A system-wide action management facility can log actions performed on the computer system(s) and record relationships between such actions (e.g., between actions of different sources, including different documents, different applications and even different computer systems). When a user discovers a mistake, the tool allows the user to select one or more past actions (i.e., the "mistake") for removal or replacement with one or more correction actions. The tool can also re-execute dependent actions to restore the relevant state of the system at the time of the designation, absent the "mistake". As such, actions throughout the system can be selectively undone, fixed and/or redone in an exemplary system-wide selective action management tool.

39 Claims, 6 Drawing Sheets

U.S. PATENT DOCUMENTS

2004/0031027 A1* 2/2004 Hiltgen .................. 717/170
2004/0031030 A1* 2/2004 Kidder et al. ............ 717/172
2005/0065907 A1* 3/2005 Chandrasekaran et al. ..... 707/1

OTHER PUBLICATIONS

Choudhary, Rajiv, Dewan, Prasun (1995): A General Multi-User Undo/Redo Model. In: Marmolin, Hans, Sundblad, Yngve; Schmidt, Kjeld (ed.): Proceedings of the Fourth European Conference on Computer-Supported Cooperative Work—ECSCW 95. Sep. 11-15, 1995, Stockholm, Sweden. p. 231-246.*

Preguica, Nuno; Shapiro, Marc; Matheson, Caroline; "Efficient Semantics-Aware Reconciliation for Optimistic Write Sharing"; Microsoft Corporation, May 2002; title+pp. 1-30.

* cited by examiner

SYSTEM-WIDE SELECTIVE ACTION MANAGEMENT

RELATED APPLICATIONS

The present application is a continuation-in-part of U.S. Pat. Ser. No. 10/602,201 entitled "RECONCILABLE AND UNDOABLE FILE SYSTEM" and filed on Jun. 24, 2003, incorporated herein by reference for all that it discloses and teaches now abandoned.

TECHNICAL FIELD

The invention relates generally to computer system management, and more particularly to system-wide selective action management.

BACKGROUND

Computers are complicated devices that can provide rich functionality through a large variety of application and operating system (OS) features. However, computer applications and systems remain hard to use in many situations for many users. Moreover, computer applications and systems can be unforgiving when something goes wrong. As interconnections between applications and between systems increase, the opportunities for a user's small mistake to corrupt large amounts of state throughout one or more computer systems multiply.

One approach to helping the user out in such situations includes the familiar "undo" feature known in many contemporary applications. However, this approach can be inadequate at least because the effects of some "mistakes" can propagate throughout multiple applications, including the operating system, and through other interconnected systems. In addition, implementations of this approach tend to be strictly chronological in nature and applicable in only a small time frame (e.g., for only a limited number of actions or only while the application is in its current execution instance). In contrast, another approach allows restoration of an OS state (e.g., after a system crash or to return to a previous OS version), but this approach does not integrate its restorative effects into multiple applications executing within one or more systems nor does it apply to non-OS applications. Accordingly, existing approaches leave much room for improvement.

SUMMARY

Implementations described and claimed herein address the foregoing problems by providing a system-wide selective action management tool. Exemplary implementations of the tool can support selective action management for multiple applications (including the operating system and its components, such as a file system) executing on one or more computer systems. A system-wide action management tool can log actions performed on the computer system(s) and record relationships among such actions (e.g., actions associated with other computer-related sources, including different documents, different applications and even different computer systems). When a user discovers a mistake, the tool allows the user to select one or more past actions (i.e., the "mistake") for removal or for replacement with one or more corrected actions. Given this action selection, the tool can also roll back intervening actions executed between the most recent action and the selected action(s). The tool can also re-execute dependent actions to restore the relevant state of the system at the time of the designation, absent the "mistake". As such, actions throughout the system can be selectively undone, fixed and/or redone in an exemplary system-wide selective action management tool.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for executing a computer process on a computer system. Action information that pertains to an action of a first computer-related source and an associated relationship with a recorded action of a second computer-related source is recorded. An action management operation is executed on the action of the first computer-related source and the recorded action of the second computer-related source.

In another implementation, a method is provided. Action information that pertains to an action of a first computer-related source and an associated relationship with a recorded action of a second computer-related source is recorded. An action management operation is executed on the action of the first computer-related source and the recorded action of the second computer-related source.

In another implementation, a system includes an action log that records action information pertaining to an action of a first computer-related source and an associated relationship with a recorded action of a second computer-related source. An action management module executes an action management operation on the action of the first computer-related source and the recorded action of the second computer-related source.

Other implementations are also described and recited herein.

DETAILED DESCRIPTION

In one implementation, a system-wide selective action management facility operates on logical actions and relationships among logical actions. Logical actions may be associated with different applications (including operating system processes) within a computer system or distributed among multiple computer systems. Generally, logical actions may represent, with varying levels of granularity, operations, commands, primitives, method calls, etc. executed at the application or kernel levels of a computer system. For example, a user may instruct the system to change the current style (e.g., font style, paragraph style, etc.). The action of "change style" is one example of a logical action. In addition, the "change style" may entail multiple component actions (i.e., at a finer level of granularity), such as "bold selected text", "underline selected text", and "change font of selected text". It should be understood that any number of levels of granularity may exist, and in some implementations, the level of granularity seen by the user may be managed by the user through a user interface (UI).

Individual actions in a system may be selected to be undone, fixed (e.g., replaced), and redone. To undo an action makes it inactive, which "rolls back" its effects. In one implementation, the selected action may be undone without "rolling back" all intervening actions (e.g., by only "rolling back" those actions that depend, directly or indirectly, on the selected action). In addition, in one implementation, such action management operations may also be "previewed", such that the operations are executed or rolled back as appropriate, and the results are displayed, but the results are not persisted in the system(s). As such, the user can view the projected results of the operations without permanently altering the current system state. Accordingly, system-wide selective action management can extend beyond the strictly chronological constraints of traditional undo/redo systems.

Figure 1:
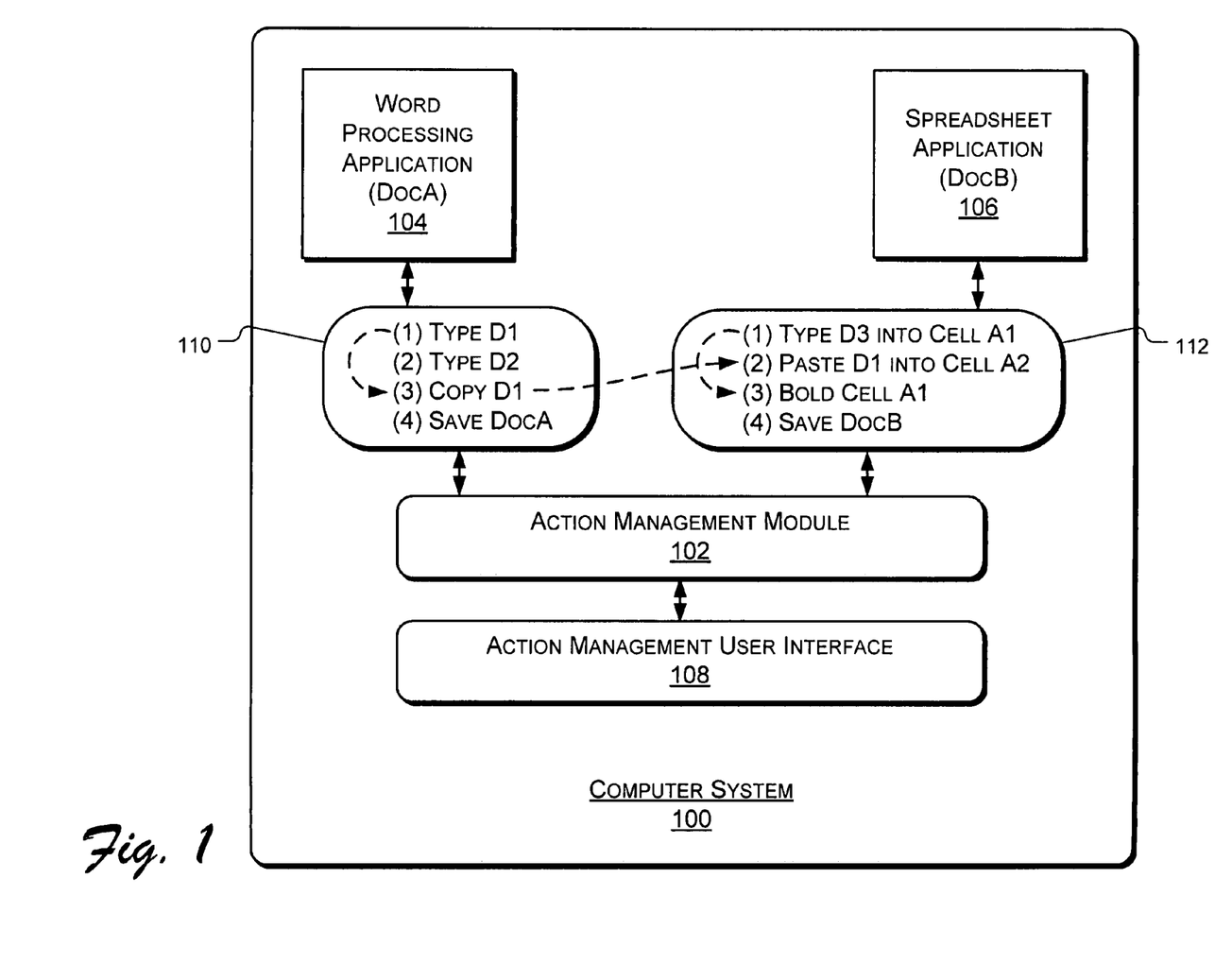
FIG. 1 illustrates a computer system executing an exemplary action management module.

FIG. 1 illustrates a computer system 100 executing an exemplary action management module 102. A first computer-related source, such a word processing application 104, and a second computer-related source, such as a spreadsheet application 106, are executing on the computer system 100. It should be understood, however, that the applications may be executing on different computer systems, including computer systems that are separate from the computer system executing the action management module 102. Furthermore, while each application may be considered a computer-related source, other computer-related sources may also include documents, objects, system levels (e.g., application level, kernel level), computer systems, computer processes, and other action sources.

Each of the applications 104 and 106 may include its own traditional undo/redo facility or an enhanced application-specific action management facility. If so, each application 104 and 106 can use its facility to perform some level of action management within the individual application. Notwithstanding, in one implementation, each application 104 and 106 registers with the action management module 102 in order to participate in the system-wide selective action management features. Such registration requests may be received from within the computer system 100, or they may be received from another computer system.

Each application 104 and 106 records a log of actions it executes and the relationships each action has with other actions. For example, the application 104 records a log 110 of actions performed during editing of a document (i.e., "DocA"). The log 110 records the actions (1)-(4) and their relationships to other actions.

Two of the actions in the log 110 (i.e., actions (1) and (3)) have a relationship (i.e., a predecessor-successor dependency) between them. In one implementation, the relationship is recorded in association with each related action, although in other embodiments, the relationship may be recorded in association with only one action or the other. In addition, one action in the log 110 (i.e., action (3)) has a relationship (i.e., also a predecessor-successor dependency) with an action executed by the application 106.

The action management system depicted in FIG. 1 may record actions and relationships that are provided externally. Several cases are possible (not depicted in the figure). For example, the user might indicate explicitly her intent to relate two apparently unrelated actions such that two actions designated to be part of an atomic "parcel". A relation might alternatively be part of operating system semantics. For example, there is a causal (also called "predecessor-successor") relation between a copy and a paste action. Relations may also be inferred by heuristics. For example, if the user reads one document and writes another immediately afterwards in time, the system may infer that the latter depends on the former.

In an exemplary implementation, the logs 110 and 112 contain a data structure specifying the actions and their relationships with other actions. One such exemplary data structure contains the following fields:

(1) An Action ID—identifying the primary action (e.g., a GUID ("Globally Unique IDentifier")
(2) A Source ID—identifying the source (e.g., application, document, process, system level, computer system, etc.) that executed the primary action (e.g., a GUID)
(3) An Action Descriptor—describing the action such that the action can be undone and/or redone (e.g., "mkdir D1")
(4) A Container Action ID—identifying a component action of which the primary action is a component action
(5) A Component Action ID—identifying a component action that is a component of the primary action (which is the corresponding container action). In another implementation, container-contained relations are designated as just a specific type of relationship (see Field 7 below).
(6) An "Inactive" Flag—indicating that the action is not active (e.g. has been undone), allowing a distinctive display in the UI. For example, inactive actions might be grayed out. In another implementation, an active status may be designated by a causal relationship with a special "always done" action and an inactive status may be designated by a causal relationship with a special "never done" action.
(7) A Relationship Descriptor—describing the relationship with another action (e.g., NULL, Predecessor, Successor, Parcel)
(8) The Related Action ID—identifying the action to which the primary action is related (e.g., a GUID)
(9) The Related Source ID—identifying the source that executed the related action (e.g., a GUID)

In addition, in some implementations, fields (7)-(9) may be repeated to specify relationships with different related actions or to specify different relationship types with the same related action. Other data structures may be employed in alternative implementations.

Various implementations may employ logs in different ways. For example, in a simpler implementation suggested by FIG. 1, each application merely records its action information (which generally includes actions and relationships) and passes its action log to the action management module 102. The action management module 102 then provides a user interface 108 for action management operations associated with all registered sources. While feasible, this approach does not leverage any (possibly existing and probably more user-familiar) action management facilities of individual applications.

Nevertheless, given the various logs of actions and relationships, the action management module 102 can provide an integrated action management UI 108 that displays recorded actions at a given level of granularity for all registered sources and receives action selections and action management commands relating to the displayed actions. For example, through the action management UI 108, a user may select an action, instruct the action management module 102 to "fix" the selected action, and input information for the corrected action. Fixing an action may consist of undoing the actions that depend upon it, undoing the action itself, replacing the action with a corrected action, executing the corrected action, and redoing dependent actions. This returns the system to a corrected state. If this is not the desired state, the user may perform further fixes, or revert back to the original state.

In some circumstances, a selected action may be related to an action of a computer-related source that is inactive (e.g., not currently executing or accessible). In one implementation, the associated action management command fails if the selected action or an intervening related action is related to an action of an inactive source. In an alternative implementation, the action management module 102 may execute, open or otherwise gain access to the inactive source in order to access the related action (e.g., to execute the action management command on the related action of the source).

Figure 2:
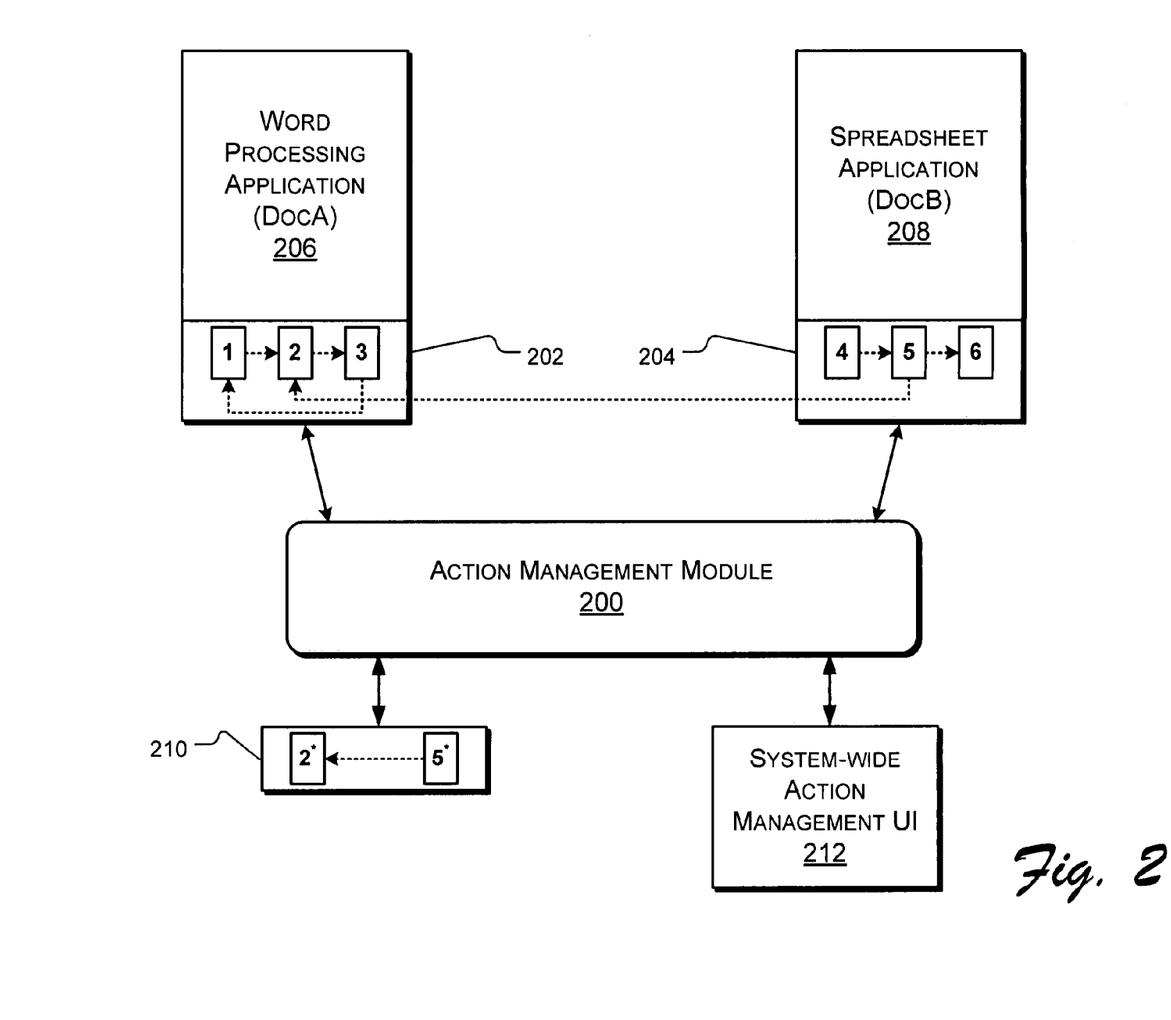
FIG. 2 illustrates an exemplary selective action management module interacting with application-specific action management facilities.

In one implementation, actions that have been "undone" remain persisted in the log, albeit marked as inactive. For example, undone inactive actions may be displayed as "grayed out" in the UI 108. In this manner, inactive actions may be selected for other action management operations after they have been undone. FIG. 2 illustrates an exemplary selective action management module 200 interacting with application-specific action management facilities 202 and 204 of applications 206 and 208, respectively. In the illustrated implementation, individual applications can maintain their own action logs and provide action management functionality through their individual action logs and their individual action management UI facilities. In such implementations, information regarding the cross-source relationships and the related sources may be passed to the action management module 200, as shown in the record of a system-wide log 210. The actions "2*" and "5*" recorded in the system-wide log 210 may be full or partial instances of the actions "2" and "5" in the facilities 202 and 204 or may be references to the action information managed by these facilities.

In one example, if the source IDs of a selected action and a related action do not match, the application-specific action management facility may indicate that it cannot perform the selected action management operation (e.g., undo) and, therefore, refer the user to the system-wide action management facility, controlled by the action management module 200.

In yet another alternative implementation, an application-specific action management facility, such as facility 202, can detect the cross-source relationship and then interact with the action management module 200 to perform the selected action management operation. For example, the application-specific action management UI 202 can highlight its action (2) as having a cross-source relationship. Therefore, if the action (2) is selected for or implicated in an undo operation, the application specific action management facility 202 notifies the action management module 200 of the related action IDs, the source IDs, the relationships, and the selected action management command. The action management module 200 can also obtain the related action IDs, source IDs, and relationships from its own logs. The action management module 200 then coordinates the selected action management operation among the related sources, either through the individual application-specific action management UIs, where possible, or by providing its own system-wide action management UI 212, which can integrate the action information from all registered sources.

As discussed previously, the related source need not be active at the time the cross-source action management operation is selected. For example, application 208 may be closed at the time action (2) of the application 206 is selected for an "undo" operation. In such circumstances, the undo operation may fail, or the application 206 may be started in order to complete the undo operation.

Figure 3:
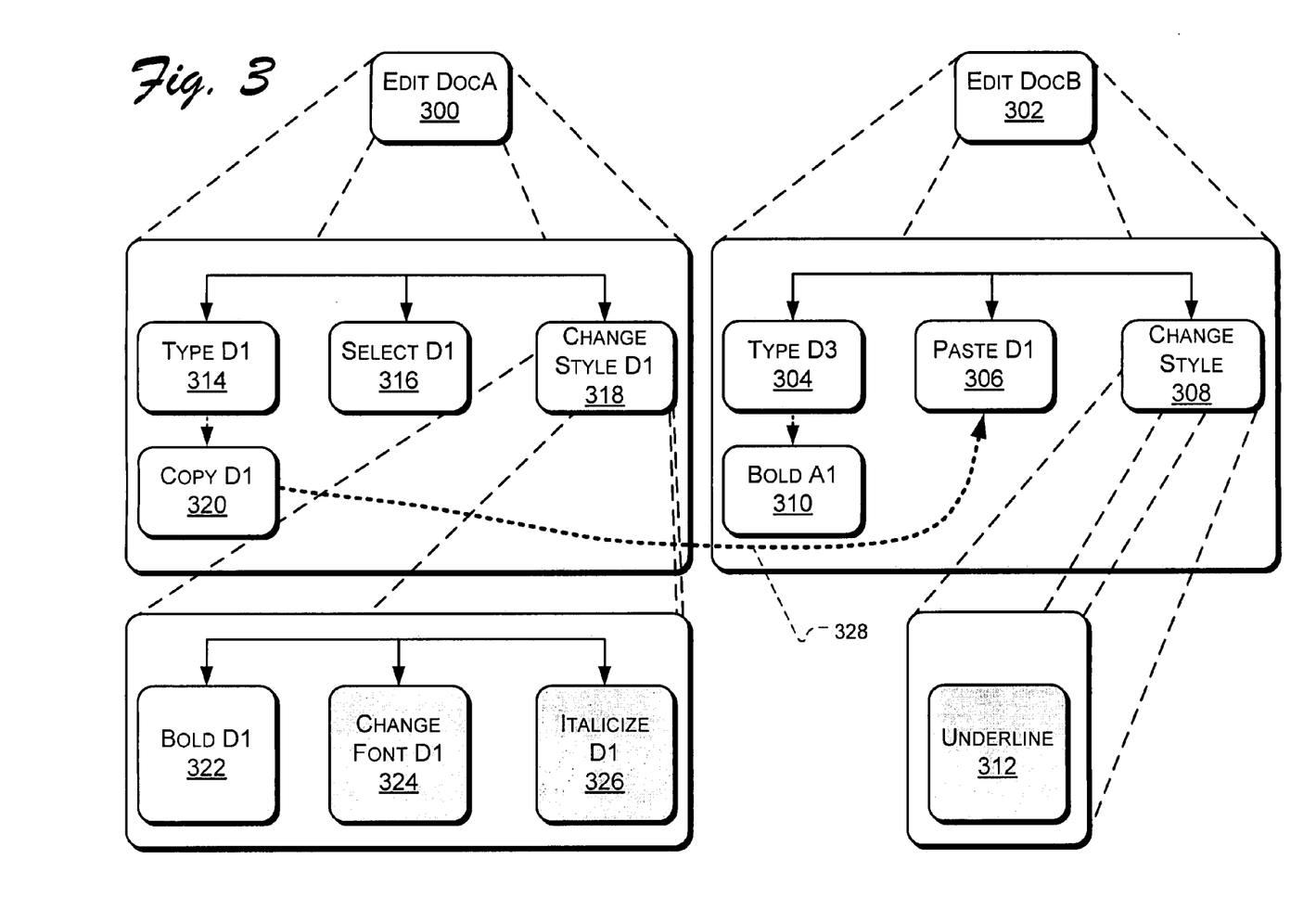
FIG. 3 illustrates an exemplary hierarchy of logical actions.

FIG. 3 illustrates an exemplary hierarchy of logical actions. Previous descriptions herein have focused on one level of action granularity. However, in some implementations, actions may be displayed and operated on at various levels of granularity. As shown in FIG. 3, two container actions 300 and 302 (i.e., "edit DocA" and "edit DocB") may be displayed in one or more action management UIs. Either action may be selected for a given action management operation. For example, action 302 may be selected for an "undo" operation. As such, each of the component actions 304, 306, 308, and 310 of the container action 302 are undone (i.e., a previous system state is restored, absent the undone action 302). Note that action 310 is dependent upon action 304.

Each component action may also be a container action. The "change style" operation 308 includes a primitive component action 312. "Primitive" denotes that the action is the lowest level (or most decomposed) action available through the action management facility. It should be noted, however, that lower level actions may exist, such as individual method calls or microprocessor instructions.

The levels of granularity available are dictated by the individual action management facilities of the various sources, including the various applications, objects, and the computer systems. It should also be understood that one or more of the component actions 304, 306, 308, 310, and 312 may be selected for an action management operation. For example, the "change style D1" action 308 may be selected for an undo operation, which results in the undoing of its component action 312, while leaving the other unrelated component actions 304, 306, and 310 of the container action 302 unchanged.

To contrast the hierarchy associated with action 302 with that of action 300, consider execution of an action management operation on container action 300, which has component actions 314, 316, 318, and 320. For example, undoing the action 300 results in the undoing of the component actions 314, 316, 318, and 320, and, necessarily, the component actions thereof (such as component actions 322, 324, and 326 of action 318). It should also be noted that a relationship between action 320 and action 306 is indicated by dashed arrow 328. Therefore, in one implementation, the action 306 is also undone.

Figure 4:
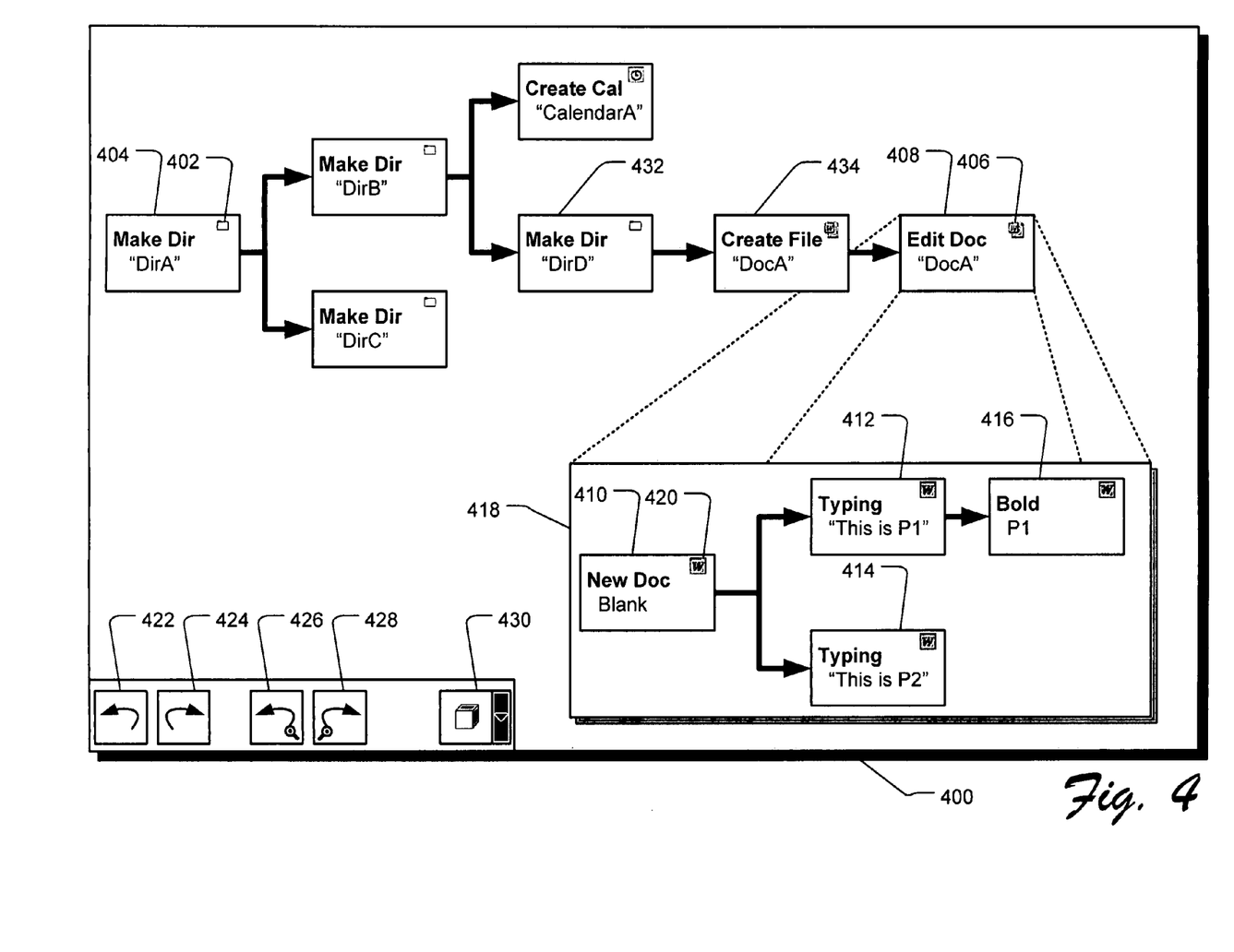
FIG. 4 illustrates a user interface for an exemplary selective action management facility.

FIG. 4 illustrates a user interface window 400 for an exemplary selective action management facility. A system-wide aspect of the UI is shown, as denoted by the various icons shown in each action block (e.g., a file system icon 402 in a file system "Make Dir" action 404 as compared to a word processing icon 406 in a word processing "Edit Doc" action 408).

Actions are displayed at a given level of granularity in a causal order (i.e., showing predecessor-successor relationships). One alternative ordering that may be displayed is based on the chronological execution of each action within the system, although other orders may also be employed. In addition, actions may be filtered as to source, system level, and other characteristics, such that the number and/or character of displayed actions may be limited.

The user may zoom into the container action 408 to display its component actions 410, 412, 414, and 416 in zoom window 418. These component actions 410, 412, 414, and 416 are shown as actions performed in a word processing document, as denoted by the document icon 420.

Various action management operation controls are show in the lower left corner of the user interface window 400. An undo control 422 allows a user to undo one or more selected actions. For example, the user may select the action 432 and then activate the undo control 422 to trigger the "undoing" of the action 432. As illustrated, actions 434 and 408 are dependent upon the action 432. Therefore, actions 434 and 408 are also undone. The results of the undo operation are persisted in association with each source.

An undo preview control 426 allows a user to preview a selected undo operation, without persisting the results in association with each source. For example, the results of the undo operation may be propagated to all related actions, which may be reflected in changes to the display of the UI. In one embodiment, if all related actions are not shown in the current display, the UI may change to display the action information at a higher level so as to encompass all changes to related actions. To persist the results of the undo preview operation, an undo operation for the same selected actions may be activated.

A redo control 424 allows a user to redo one or more selected actions. To redo consists of making active, and executing, an action that was previously inactive, and similarly for all actions that depend (directly or indirectly) upon it. For example, the user may select text in DocA, select the action 432, and then activate the redo control 424 to trigger re-execution of the action 432, 434 and 408. When completed, the results of the redo operation are persisted in association with each source.

A redo preview control 428 allows a user to preview a selected redo operation, without persisting the results in association with each source. For example, the results of the redo operation may be propagated to all related actions, which may be reflected in changes to the display of the UI. In one embodiment, if all related actions are not shown in the current display, the UI may change to display the action information at a higher level so as to encompass all changes to related actions. To persist the results of the redo preview operation, a redo operation for the same selected actions may be activated.

Although not specifically illustrated in FIG. 4, another exemplary action management operation is a "fix" operation, in which an action is modified or replaced with a different action. For example, a user may "fix" action 432 by selecting it and activating a "fix" operation through a provided control (not shown). The resulting operations are generally source-dependent and action-dependent. Nevertheless, in one "fix" example, a context menu may be displayed offering valid "fix" options, such as inserting additional actions, changing the action itself (e.g., from "Make Dir" to "Create File"), or changing the parameters (e.g., "DirD") of the action 432. Accordingly, in one implementation, the "fix" operation causes the original action 432 to be undone and replaced with one or more corrected actions (e.g., an action of the same action type as action 432 but with a different directory name, a different action, etc.).

As mentioned above, multiple actions may be selected as the target of an action management operation. In one implementation, actions may be ordered chronologically, such that multiple actions can be selected in accordance with the timing of their execution. As such, a user may select actions in such a way that all actions back to a given action are undone (or "rolled back"). In addition, action relationships (e.g., causal dependencies or atomicity) can result in the effective selection of multiple actions based on the manual selection of a single action.

Action relationships can be determined automatically within the individual action management facilities or they may be specified by the user through a relationship control. An exemplary relationship control is shown as "parcel" control 430, which can define a set of actions as "atomic" in nature, such that an action management command applied to one action in the parcel must be propagated to all other actions in the parcel. In contrast, a causal relationship may be defined between two actions, such that undoing a predecessor action propagates the undo action to the successor action, but an undo operation does not propagate from successor to predecessor. Another example relationship is the "alternative" whereby if one action is active, the other is inactive. Another class of exemplary relationships includes time-based constraints. For example, a relationship between two actions may require that an action management command applied to one of the actions must be applied to the other within a specified time interval.

Figure 5:
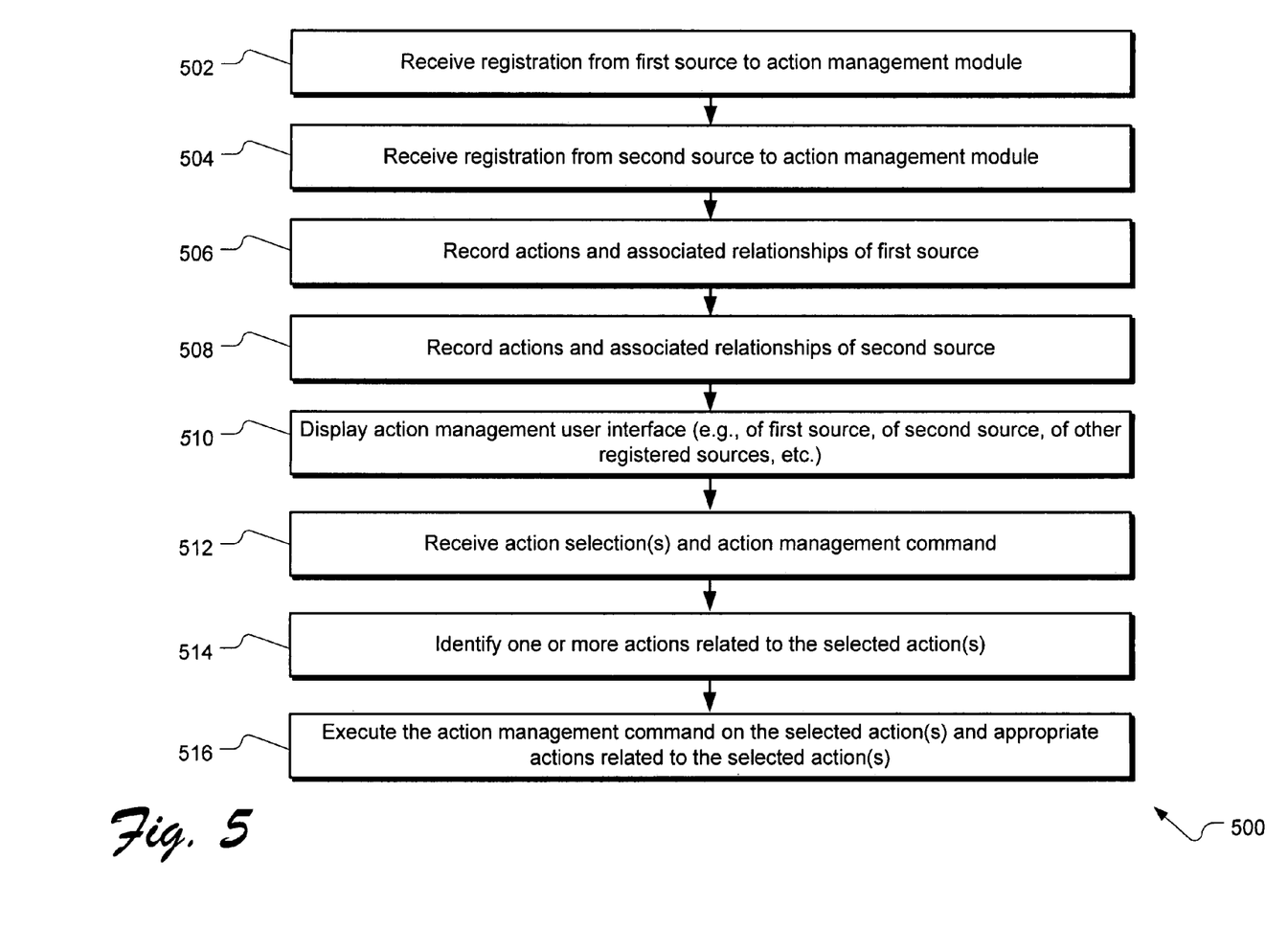
FIG. 5 illustrates operations of an exemplary selective action management process.

FIG. 5 illustrates operations 500 of an exemplary selective action management process. A registration operation 502 registers a first computer-related source with an action management module. Another registration operation 504 registers a second computer-related source with the action management module. A logging operation 506 logs the actions and associated relationships of the first source (e.g., in an action log or by passing action information to an action management module). A logging operation 508 logs the actions and associated relationships of the first source.

A user interface operation 510 displays action information in an action management user interface, such as the one shown in FIG. 4. A selection operation 512 receives a selection of one or more actions and an action management command (e.g., undo, redo preview, parcel, etc.). An identification operation 514 identifies one or more actions related to the selected action(s) and the sources corresponding to the selected actions and the related actions. In one implementation, the identification operation 514 also identifies the distributed action logs associated with each action. An action management operation 516 executes the action management command on the selected action(s) and appropriate related actions.

To better understand how selective action management might be implemented, consider some set of documents, such as DocA and DocB in FIG. 3. Each action such as 314 or 316 is a programmatic operation that changes the state of the associated document. For any given action type, the application may register a "compensation" that reverses its effect. For example, a "type character" action might be associated with a "delete character" compensation. As the user submits actions and relations, the system executes active actions as dictated by their relations and the state of the documents changes. For example, after action 314 "Type D1", the state of DocA has changed to incorporate D1. In one implementation, the roll back of the single action 314 may be achieved by applying the compensation "delete D1". Rolling back a set of actions (e.g. 314 and 316) is achieved by applying the corresponding compensations in reverse order (viz. compensate 316 then compensate 314). In an alternative implementation, the system occasionally records the current state in persistent state variables called "checkpoints". Then, rolling back a set of actions is achieved by returning the state to the nearest saved checkpoint, and either compensating or re-executing actions as appropriate.

In support of a system-wide selective action management facility, a file system can record and identify different checkpoints (also called versions) of files, record logs, record dependency information between log records and between a log record and a file checkpoint, etc.

In one implementation, a user interface to a system-wide selective action management facility provides a high-level view of the system over time. A user can zoom in and out to different levels of granularity. The user can view actions associated with different sources (e.g., applications, sites, documents, objects, processes, computer systems, system level, etc.) and relationships among the actions. The user can also review previously executed actions that resulted in an error and the consequences of undoing, fixing, and/or redoing the previously executed actions.

The different levels of granularity can be controlled by various parameters, including:
 (1) The source of the actions—which application document, site, user, object, system level (e.g., application level, kernel level, method level, microprocessor level, etc.) is responsible for the actions
 (2) The orientation of the actions—chronological relationships, causal relationships, etc.
 (3) A filter—which may be applied to refine the focus of the display. For example, a filter may focus on a specific time period, or actions that modify a particular portion of a document. In another example, an administrator may focus on time periods in which system configuration objects (e.g., a configuration file or registry) had been recently updated.

The scope of an action management operation is defined as the set of actions that are undone, fixed and redone by the action management command. The user is notified if the selected action management operation would have ramifications outside of the selected scope. The scope of an undo should include all the actions that depend on the action to be undone.

The scope of persisted action management operations (e.g., undo, fix, redo) is carefully controlled by the action management facility. For example, action management operations remain in compliance with security policies. Likewise, pathological conditions, such as a "domino effect" that could cause an extreme rollback of action, may be avoided. As such, an action management operation commanded with a given scope may be denied in any one or more of the following cases:
 a. The command specifies an undo operation, and an action in the scope is explicitly designated as "not undoable".
 b. An action management operation commanded within the scope cannot be physically performed (e.g., the source is no longer available).
 c. An action management operation commanded on an action within the scope fails (e.g. if the user fixes an action, and re-executing one of the dependent actions fails, then the whole undo-fix-redo command is denied).
 d. The user does not have authorization to perform the action management operation within the scope.
 e. An action that is not in the selected scope would have to be undone or redone. (For example, given actions A, B, and C where B depends on A, and B and C are in a parcel, if the user requests to undo A, then both B and C would need to be undone, even through C is not dependent upon A.)
 f. Action information for the selected action or a related action is missing (e.g., the action log is corrupted).

Action log size is readily controlled by limiting the allowed recovery period (e.g., to one year). Older logs can be put into tertiary storage or removed altogether. Another approach is to coarsen the available time granularity of action management operations. For example, if the user is allowed to go back to any specific point in time, the number of log entries is quite large. However, if the user is only allowed to go to fixed points in time (e.g., the end of each business day), all intermediate logs during the day may be erased. Time-limiting and granularity control may be combined such that increasing coarse granularity exists farther in the past. Furthermore, actions that precede an action that cannot be undone can be pruned from the action log.

From time to time, both application-specific and system-wide action management facilities may record the state of their related source(s) as "checkpoints". However, checkpoint data may also cause significant disk usage. The greater number of checkpoints recorded, the quicker the action management operation may be performed, but at the expense of disk utilization. As such, the interval of checkpoints may be increased as the checkpoints get older (i.e., older checkpoints at various intervals may be erased as time passes).

Figure 6:
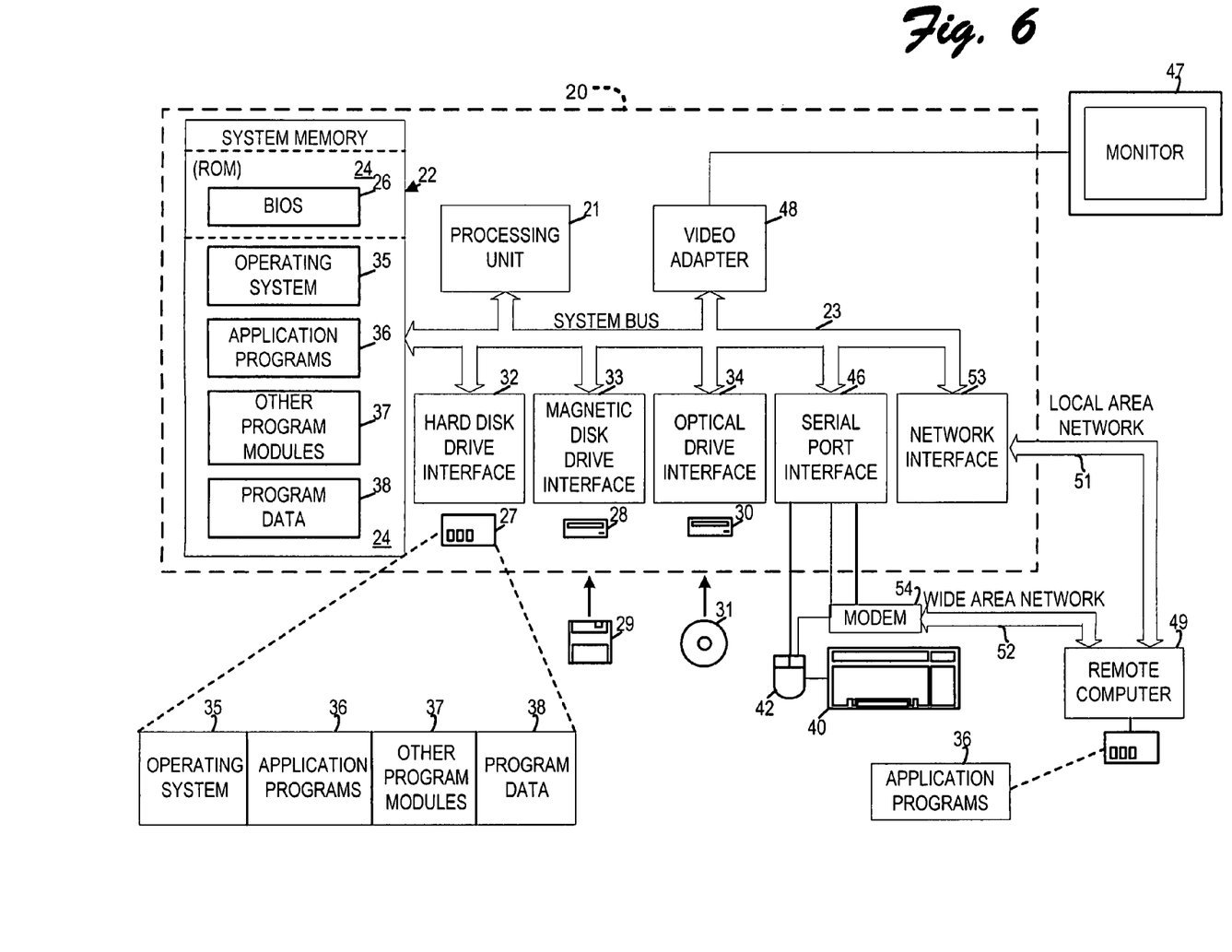
FIG. 6 illustrates a system useful for implementing an embodiment of the present invention.

The exemplary hardware and operating environment of FIG. 6 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, an action management module, an action management UI, various applications, and other modules may be incorporated as part of the operating system 35, application programs 36, or other program modules 37. Action logs and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
   recording action information pertaining to a first action executed in a first computer application;
   identifying a crosssource relationship between the first action and a second action executed in a second computer application, the first computer application being a different computer application from the second computer application;
   executing a first action management operation on the first action responsive to executing the first action management operation, executing a second action management operation on the second action based on the identified cross-source relationship; and
   outputting a result corresponding to executing the first action management operation or the second action management operation,
   wherein execution of the first action generates a first result of the first computer application, execution of the second action generates a second result of the second computer application, executing the second action management operation includes modifying the second result of the second action, and executing the first action management operation includes fixing the first action, the fixing including:
      undoing a dependent action, the dependent action being dependent on the first action;
      undoing the first action;
      receiving a corrected action corresponding to the first action;
      executing the corrected action; and
      redoing the dependent action.

2. The method of claim 1 wherein the cross-source relationship includes a predecessor-successor relationship between the first action and the second action.

3. The method of claim 2 wherein execution of the second action is dependent on the execution of the first action.

4. The method of claim 3 wherein the first action is a different action from the second action and the second action is not executed if the first action is not executed.

5. The method of claim 3 wherein the first action is a different action from the second action and execution of the first action generates results that are different from results generated by execution of the second action.

6. The method of claim 1 wherein the first action management operation includes undoing the first action and rolling back the first result.

7. The method of claim 6 wherein the second action management operation includes the second action, and wherein undoing the second action includes rolling back the second result.

8. The method of claim 7 wherein the second action is a different action from the first action.

9. The method of claim 1 wherein the second application is inactive and executing the second action management operation includes;

activating the second application; and accessing the second action management operation on the second action based on the activating.

10. The method of claim 1 wherein the cross-source relationship includes an atomic parcel relationship between the first action and the second action.

11. The method of claim 1 wherein executing the first action management operation includes:

displaying a plurality of first computer application actions executed in the first computer application, wherein the plurality of first computer application actions includes the first action;

receiving a selection of the first action in the plurality of first computer application actions; and executing the first action management operation on the selected first action.

12. The method of claim 1 wherein identifying the cross-source relationship includes receiving a related action identifier from the first computer application, the related action identifier indicating the cross-source relationship between the first action and the second action.

13. The method of claim 1 wherein the first action, the second action, the first action management operation, and the second action management operation are executed by a single user.

14. A computer readable storage medium encoding a computer program for executing on a computer system a computer process, the computer process comprising:

recording action information pertaining to an action of the first computer-related source;

recording a related action identifier corresponding to the action of the first computer-related source, the related action identifier for indicating an associated relationship with a recorded action of a second computer-related source, the first computer-related source being a different computer-related source from the second computer-related source;

displaying the action information including the action of the first computer-related source and at least one action management one ration;

receiving a selection of the action of the first computer-related source and the at least one action management operation;

executing the selected at least one action management operation on the selected action of the first computer-related source;

executing the selected at least one action management operation on the recorded action of the second computer-related source based on the associated relationship; and outputting a result corresponding to executing the selected at least one action management operation on the selected action of the first computer-related source or on the recorded action of the second computer-related source, wherein executing the selected at least one action management operation on the recorded action of the second computer-related source comprises:

identifying the related action identifier;

comparing the related action identifier to the recorded action of the second computer-related source; and executing the selected at least one action management operation on the recorded action of the second computer-related source based on the comparing.

15. The computer readable storage medium of claim 14 wherein executing the selected at least one action management operation on the recorded action of the second computer-related source comprises executing the selected at least one action management operation on the recorded action only if the related action identifier matches the recorded action.

16. The computer readable storage medium of claim 14 wherein the first computer-related source comprises a first computer application and the second computer-related source comprises a second computer application, the first computer application being a different computer application from the second computer application.

17. The computer readable storage medium of claim 16 wherein the second computer application is inactive and wherein executing the selected at least one action management operation on the recorded action of the second computer-related source comprises:

activating the second computer application; and executing the selected at least one action management operation on the recorded action of the activated second computer application.

18. The computer readable storage medium of claim 16 wherein recording action information pertaining to an action of the first computer-related source comprises:

receiving a first log of actions from the first computer application, the first log of actions including actions executed on the first computer application; and receiving a second log of actions from the second computer application, the second log of actions including actions executed on the second computer application.

19. The computer readable storage medium of claim 18 wherein recording a related action identifier includes receiving the related action identifier from the first computer application.

20. A computer readable storage medium encoding a computer program for executing on a computer system a computer process, the computer process comprising:

recording action information pertaining to an action of the first computer-related source, the first computer-related source including a first computer application, including:

receiving a first log of actions from the first computer application, the first log of actions including actions executed on the first computer application; and receiving a second log of actions from the second computer application, the second log of actions including actions executed on the second computer application:

recording a related action identifier corresponding to the action of the first computer-related source including receiving the related action identifier from the first computer application, the related action identifier for indicating an associated relationship with a recorded action of a second computer-related source comprising a second computer application, the first computer-related source being a different computer-related source from the second computer-related source and the first computer application being a different computer application from the second computer application;

displaying the action information including the action of the first computer-related source and at least one action management one operation;

receiving a selection of the action of the first computer-related source and the at least one action management operation;

executing the selected at least one action management operation on the selected action of the first computer-related source;

executing the selected at least one action management operation on the recorded action of the second computer-related source based on the associated relationship; and outputting a result corresponding to executing the selected at least one action management operation on the selected action of the first computer-related source or on the recorded action of the second computer-related source wherein executing the selected at least one action management operation on the recorded action of the second computer-related source includes:

comparing the related action identifier received from the first computer application to the recorded action of the second computer-related source; and executing the selected at least one action management operation on the recorded action of the second computer-related source based on the comparing.

21. The computer readable storage medium of claim 20 wherein executing the selected at least one action management operation on the recorded action of the second computer-related source only if the related action identifier received from the first computer application matches the recorded action.

22. The method of claim 1 further comprising receiving a first log of actions from the first computer application and a second log of actions from the second computer application, the first log of actions including actions executed in the first computer application and the second log of actions including actions executed in the second computer application.

23. The method of claim 22 wherein at least one action in the first log of actions has a cross-source relationship with at least one action in the second log of actions.

24. The method of claim 22 wherein each action in the first log of actions and each action in the second log of actions includes an action identifier for identifying the corresponding action.

25. The method of claim 22 wherein the first log further contains a first source identifier for identifying the first computer application and the second log further contains a second source identifier for identifying the second computer application.

26. The method of claim 25 wherein the first source identifier and the second source identifier are different.

27. The method of claim 1 further comprising:

displaying a plurality of first computer application actions executed in the first computer application, wherein the plurality of first computer application actions includes the first action;

displaying a plurality of action management operations wherein the plurality of action management operations includes the first action management operation;

receiving a selection of the first action in the plurality of first computer application actions; and receiving a selection of the first action management operation in the plurality of action management operations.

28. The method of claim 27 wherein identifying a cross-source relationship includes receiving a related action identifier corresponding to the first action, the related action identifier for indicating a cross-source relationship between the first action and the second action.

29. The method of claim 28 wherein executing the first action management operation on the first action includes executing the selected first action management operation on the selected first action.

30. A computer-implemented method for modifying a previously applied action in an application, the method comprising:

recording at least one action information pertaining to a first corresponding to a first application and an associated relationship between the at least one action executed in a of the first computer application;

identifying a cross-source relationship between the first action and a recorded second action of executed in a second computer application, the first computer application being a different computer application from the second computer application including receiving a related action identifier corresponding to the first action, the related action identifier for indicating a cross-source relationship between the first action and the second action;

executing a first action management operation on the at least one first action of the first application, the first operation causing a first modification to the at least one action of the first application including executing the selected first action management operation on the selected first action;

responsive to executing the first action management operation, executing a second action management operation on the recorded action of the second application responsive to the execution of the first operation on the at least one action of the first application and based on the identified relationship; and between the at least one action of the first application and the recorded action of the second application, the second operation causing a second modification to the recorded action of the second application corresponding to the first modification to the action of the first application outputting a result corresponding to executing the first action management operation or the second action management operation displaying a plurality of first computer application actions executed in the first computer application, wherein the plurality of first computer application actions includes the first action;

displaying a plurality of action management operations wherein the plurality of action management operations includes the first action management operation;

receiving a selection of the first action in the plurality of first computer application actions; and receiving a selection of the first action management operation in the plurality of action management operations, wherein executing the second action management operation on the second action includes:

comparing the related action identifier to the second action; and executing the second action management operation based on the comparing.

31. The method of claim 30 wherein executing the second action management operation based on the comparing comprises executing the second action management operation if the related action identifier matches the second action, otherwise not executing the second action management operation on the second action.

32. The computer readable storage medium of claim 14 wherein the action management operation comprises:

replacing the action of the first application and the recorded action of the second application with another action of a different action type.

33. The computer readable storage medium of claim 14 wherein the action management operation comprises:

replacing the action of the first application and the recorded action of the second application with another action of the same action type having different action parameters.

34. The computer readable storage medium of claim 14 wherein the action management operation comprises:

replacing the action of the first application and the recorded action of the second application with multiple actions.

35. The computer readable storage medium of claim 14 wherein recording action information pertaining to an action of the first computer-related source includes recording a plurality of actions corresponding to the first application, the plurality of actions including the at least one action and a dependent action dependent on the at least one action.

36. The computer readable storage medium of claim 14 wherein the second application is inactive and wherein the computer process further comprises:

executing the inactive second application responsive to execution of the action management operation.

37. The computer readable storage medium of claim 14 wherein the second application comprises a document.

38. The computer readable storage medium of claim 14 wherein the second application comprises an inactive document and the computer process further comprises:

executing an application on the inactive document responsive to execution of the action management operation.

39. The computer readable storage medium of claim 35 wherein the dependent action is automatically modified responsive to modification of the at least one action of the first application.

* * * * *